United States Patent [19]

Gold et al.

[11] Patent Number: 4,891,478

[45] Date of Patent: * Jan. 2, 1990

[54] ANTI-THEFT SYSTEM

[76] Inventors: Peter N. Gold, 465 N. Wood Rd., Rockville Centre, N.Y. 11570; Louis M. Vagnone, 2492 Wantagh Ave., Wantagh, N.Y. 11793; Richard Raheb, 1900 Horatio Ave., Merrick, N.Y. 11566

[*] Notice: The portion of the term of this patent subsequent to Aug. 9, 2005 has been disclaimed.

[21] Appl. No.: 191,959

[22] Filed: May 9, 1988

Related U.S. Application Data

[63] Continuation of Ser. No. 939,409, Dec. 8, 1986, Pat. No. 4,762,198.

[51] Int. Cl.4 .............................................. B60R 25/04
[52] U.S. Cl. ............................... 200/61.66; 200/61.62; 200/43.01; 200/296; 180/287
[58] Field of Search .................... 180/287; 200/61.66, 200/61.79, 61.8, 61.62, 161, DIG. 2, 43.01, 43.04, 43.07, 244, 250, 296

[56] References Cited

U.S. PATENT DOCUMENTS

| | | | |
|---|---|---|---|
| 3,138,780 | 6/1964 | Jacobsen | 200/61.66 |
| 4,192,400 | 3/1980 | McEwan | 180/287 |
| 4,515,237 | 5/1985 | Gonzalez et al. | 180/287 |
| 4,628,300 | 12/1986 | Amato | 180/287 |
| 4,638,293 | 1/1987 | Min | 180/287 |

Primary Examiner—Richard A. Bertsch
Attorney, Agent, or Firm—Myron Amer

[57] ABSTRACT

A dwelling security system includes, in a strategic location behind the dwelling wall which mounts the door into the dwelling, an auxiliary switch that has a small diameter tube and switch contacts at the end of the tube, such that access to the switch contacts at the ens must be made through the tube, by using an insertable probe. The entrance opening into the tube through which the probe is inserted is 'hidden' by being disguised as a decorative feature of the dwelling wall.

1 Claim, 2 Drawing Sheets

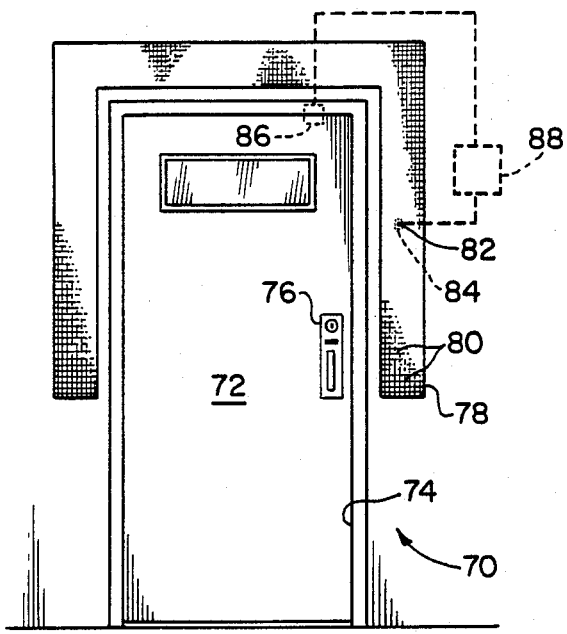
FIG.4
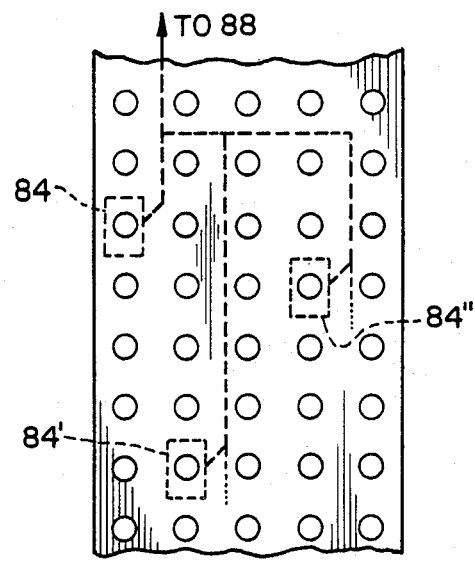
FIG.5
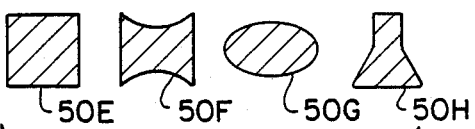
FIG.8
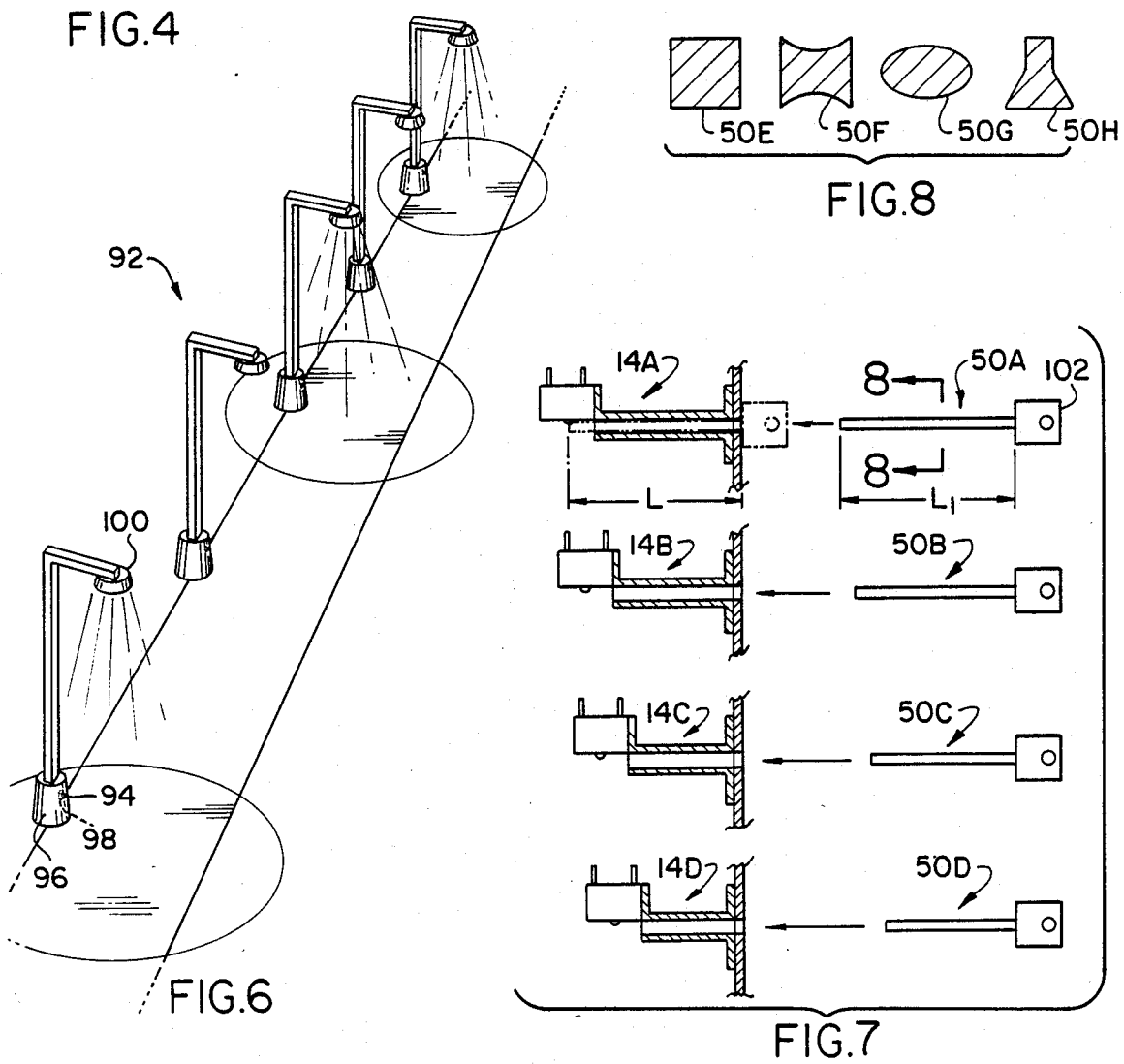
FIG.6
FIG.7

ANTI-THEFT SYSTEM

This application is a continuation of U.S. patent application Ser. No. 939,409 filed Dec. 8, 1986 now U.S. Pat. No. 4,762,198.

The present invention relates to a security switching system for preventing unauthorized activity, such as the ignition of an automobile or similar vehicle, or unauthorized entry upon premises, such as a home, as well as having other uses to be hereinafter described.

BACKGROUND OF THE INVENTION

It is well known, particularly in more expensive automobiles to provide an auxiliary switch isolating the ignition switch from the starter system. The auxiliary switch is generally in the form of a conventional manual switch and is desirably hidden from view as beneath the driver's seat or beneath the dashboard, so that presumably only the vehicle's driver would be aware of its location and thus preclude any unauthorized person, particularly thieves from starting the vehicle's engine.

Such switches have taken two forms, namely, key operated switches and toggle operated switches. The key operated switches are rather complex and expensive. Hidden key switches are inconvenient to use, since not only must the driver carry a specific key at all times, but he must bend and contort himself into the rather inaccessible location wherein the switch is hidden. The toggle operated switches, while being less expensive and not requiring a key, are equally inaccessible and have the greater problem that an experienced thief will easily find its location and be able to simply turn it on.

It is, accordingly, an object of the present invention to provide an auxiliary security switching system for a vehicle anti-theft ignition controlling circuit preventing unauthorized ignition of automobiles and similar vehicles, which system is simple in construction, inexpensive to build and install, and easy to operate while at the same time effective in securing the vehicle against unauthorized use.

SUMMARY OF THE AUTO ANTI-THEFT INVENTION

In accordance with the present invention, an automobile security switching system is provided in which an auxiliary switch is interposed in the ignition controlling circuit between the main key switch and the ignition starting unit. The auxiliary switch is formed with normally open single pole, single break contacts located behind and spaced from the outer surface of a vehicle wall, and access to the contacts is through a single small diameter entrance tube, which functions also to mount the switch behind the vehicle wall. The switch is provided with a separate probe which is insertable in the entrance tube so as to pass through the vehicle wall into engagement with the contacts of the switch, acting to close the contacts permitting current to flow through the switch. The probe is removable from the hole to automatically return the contacts to their normally open condition.

Preferably, the probe comprises a small diameter rod and the tube comprises a cylindrical passage of comparable diameter and of sufficient length so that such common objects as pencils, knives, etc. cannot be inserted therein. The hole is provided on the vehicle dashboard which is patterned, in more or less filigree form, simulating a plurality of holes so as to obscure the entrance to the tube of the auxiliary switch.

Further, the system includes relay means operable on closing of the auxiliary switch by the probe to maintain a current path between the main key switch and the normal starting device once the main key switch is subsequently closed and the engine started, even upon the removal of the probe from the auxiliary switch. The same relay means are rendered inoperative on subsequent opening of the main key switch to shut the engine, so that upon parking of the vehicle, for example, the security system is put into effect automatically.

In addition, the present system may be provided with a tertiary switch which may be jack operated or even key operated, which switch is arranged in parallel across the auxiliary switch system. In this way, when the car is given to another person to drive, as in a valet parking situation, the location of the auxiliary switch need not be disclosed in order for the valet to operate the car.

HOME SECURITY SYSTEM

The probe-actuated switch, as above generally described for use as part of a security system of an auto, is also advantageously used as part of the security system for a home, office, or other premises, from which it is desired to prevent entry by unauthorized personnel.

More particularly, here also use is made of a probe and a cooperating hole in filigree or other decoration which obscures the entrance to the tube of the auxiliary switch, so that the actuation thereof can be accomplished only by one having knowledge of the one selected opening having access to the switch.

It is thus an object of the present invention to provide an auxiliary switching system, whether for an auto, home, or the like, that is noteworthy in avoiding key switches, toggle switches, and the like and which system may be successfully hidden from all but the most persistent thieves.

The foregoing objects, together with numerous other objects and advantages are set forth in the following description of the present invention.

BRIEF DESCRIPTION OF THE DRAWINGS

In the drawings:

FIG. 4 is a front elevation of an entrance where the probe switch of FIGS. 1–3 is used to temporarily bypass a home burglar alarm;

FIG. 5 is a detail of the filigree panel shown in FIG. 4 to illustrate a further embodiment of the probe switch;

FIG. 6 is a view of a general situation involving nighttime outdoor lighting and the use of the probe switch;

FIG. 7 is a composite figure showing probes and switches of varying lengths; and FIG. 8 is a view in section taken along line 8—8 of FIG. 7 showing further details.

DESCRIPTION OF THE AUTO ANTI-THEFT INVENTION

Figure 2:
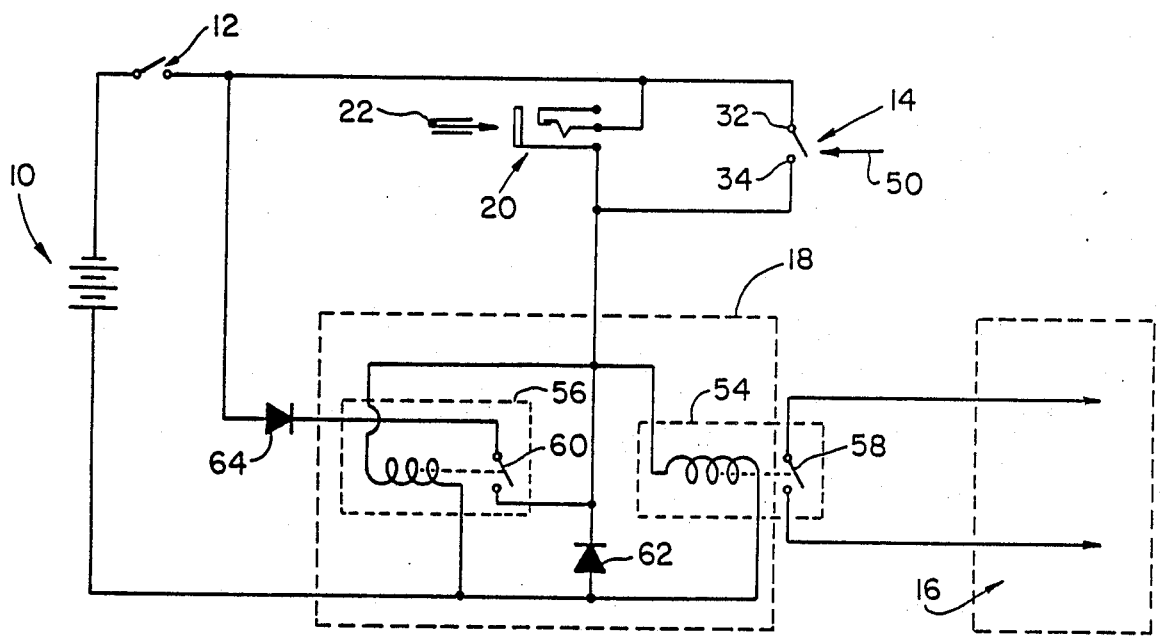
FIG. 2 is a circuit diagram showing the components of the ignition control system and their arrangement.

Before turning to the placement and location of the present ignition system within the vehicle, it will be helpful to first discuss the component parts and their electrical connection as seen in the circuit diagram of FIG. 2. A vehicle battery, generally indicated by the numeral 10, is serially connected to the main key operated ignition switch 12, an auxiliary switch, generally indicated by the numeral 14 and a starter device, generally indicated by the numeral 18, and includes a relay circuit, generally indicated by the numeral 56. A tertiary switch, generally indicated by the numeral 20, is connected in parallel across the auxiliary switch 14. The tertiary switch 20 is operated by a jack 22 when it is desired to override the auxiliary switch 14.

Figure 1:
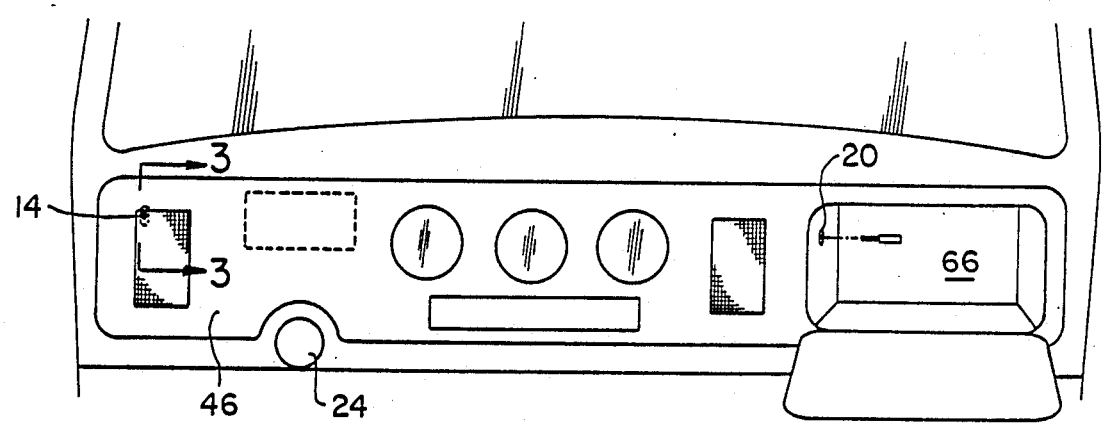
FIG. 1 is a perspective view of the dashboard of the vehicle to which the present invention has been applied.

The main key operated switch 12 is conventional, (as is the battery 10) being part of the original equipment supplied with the automobile. The switch 12 is generally located on the steering column 24 as seen in FIG. 1 and acts in cooperation with the column 24 to provide a locking mechanism designed to disable the driving wheel when the switch 12 is placed in its off or inoperative position. The switch 12 is generally of the cylinder-rotary type, being movable by a particularly cooperating key into either an ON or OFF position. Normally, the switch 12 would be connected directly to the starter relay 16 and once placed in the ON condition would permit passage of the current from the battery 10 to the starter device 16. As seen, however, in the drawings, the present invention provides for the imposition of the auxiliary switch 14 and the relay device 18 to provide the present system for preventing unauthorized ignition of the vehicle's engine, by isolating the starter device from the battery 10, unless the auxiliary switch 14 is activated.

Figure 3:
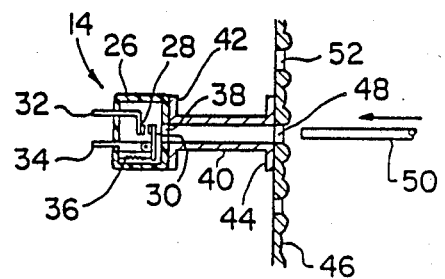
FIG. 3 is an enlarged sectional view taken along line 3—3 of FIG. 1 showing the construction of the auxiliary switch means, and its mounting on the vehicle dashboard.

As seen in detail in FIG. 3, the auxiliary switch comprises a micro housing 26 in which is mounted a fixed contact 28 and a pivotable contact 30 connected respectively to inlet/outlet terminals 32 and 34 which are connected to the battery 10 and relay device 18 respectively, as seen in FIG. 2. The pivotal contact 30 is biased by a spring 36 to be normally maintained out of contact with the fixed contact 28. Further, the pivotal contact is arranged in alignment with a hole 38 in the wall of the housing 26, which is mounted to a tubular support 40. The tubular support 40 is coaxially arranged about the hole 38 and is provided with a flange 42 at one end for mounting to the housing 26 and a flange 44 at its other end for mounting to the rear surface of a wall 46 of the vehicle such as its dashboard, (FIG. 1). The housing 26 and tubular support 40 can be integrally molded if formed of plastic, or may be welded or fastened together by clips or screws or the like, if made of plastic or other material. The forward end 44 of the tubular support 40 is similarly fashioned to the vehicle wall 46, i.e. dashboard which is provided with a hole 48 coextensive with the diameter of the tubular support 40 through which is insertable a probe 50. The probe 50 is sufficiently long so as to pass through the length of the tubular support 40 and engage against the pivotal contact 30 causing its depression into contacting engagement with the fixed contact 28.

The area about the hole 48 is patterned so as to form a plurality of preferably randomly arranged depressions 52, each giving the visual appearance of a hole simulating the hole 48, thereby actually obscuring the real hole 48 through which the probe 50 is to be inserted. The arrangement of the false holes 52, and the patterning of the dashboard in its filigree type of arrangement is preferably selected to conform to or be compatible with the general design of the dashboard itself. The location of the real hole 48 through which the probe 50 must be inserted will, of course, be randomly selected within the patterned area of the dashboard so as to be known only to the vehicle owner or driver himself. It is contemplated that there would be so many randomly arranged false holes 52 that any erstwhile thief would be discouraged from attempting to determine which hole is open. Of course, any other patterned surface, such as a lattice, screen or the like, by which the true entrance hole is obfuscated, can be used.

It will be appreciated that all the contacts 28 and 30 of the switch 14 are biased into their normally open position and can only be placed in activated position by the insertion of the narrow probe 50 through the tubular support 40. To allow the probe 50 to be withdrawn once the engine is started, the auxiliary switch 14 is connected to the relay arrangement 18 which comprises a pair of solenoids 54 and 56, connected in parallel with each other and in series between the auxiliary switch 14 and the battery 10, so as to be actuable upon closing of both the main key switch 12 and the auxiliary safety switch 14. Each of the solenoids 54 and 56 is provided with a spring loaded normally open contact 58, 60, respectively, also of the single pole, single break variety which contacts are closed, simultaneously on activation of solenoids 56 and 54. Contact 58 in the solenoid 54 is a part of the starter device 16 and upon closing of this contact 58 activates the means by which the engine is started (not shown). Contact 60, in the solenoid 56 is part of another current path between the battery 10 and the coils of each of the solenoids 54 and 56.

The circuit paths, containing the contact 60, short-circuits the auxiliary safety switch 14, so that even when the probe 50 is thereafter removed and the switch 14 opened, current from the battery will be maintained in both solenoids 54 and 56 permitting the engine to continue uninterrupted operation. The circuit paths containing the contact 60 are provided with current direction limiting devices such as diodes 62 and 64, which prevent current flow to the solenoids 54, 56 from the battery 10 through the main key switch 12 except when (a) the auxiliary switch 14 had first been closed, and (b) and once contact 60 has been closed upon the subsequent opening of the switch 14. Any opening of the main key switch 12, thereafter, renders the entire control system inactive, removing current from the coils of solenoids 54 and 56, opening contacts 58 and 60 and shutting off the engine.

Preferably, the solenoid 54 is a conventional Bosch relay while solenoid 56 is a Reed relay.

To avoid disclosure of the location of the auxiliary switch 14 to others, and yet allow such others to use the vehicle when necessary, as, for example, a mechanic or valet, the tertiary override switch 20 is employed. The override switch 20 may be of the pushbutton or toggle type, rather than of the jack type as illustrated and is preferably placed in the glove compartment 66 of the vehicle (FIG. 1) so as to be easily available, yet not otherwise encumbering the dashboard. The auxilary override switch merely bypasses the auxiliary switch and functions exactly like it in the control system.

It will be seen from the foregoing that the present invention provides a simple, yet effective ignition control and anti-theft system for automobiles, which can be successfully hidden from thieves.

PROBE-SWITCH USES FOR HOME SECURITY AND OTHER USES

In addition to the anti-auto theft application described in conjunction with FIGS. 1, 2 and 3, other probe-switch uses can advantageously be made, as now will be described.

In FIG. 4 is shown an entrance way 70 to a home. Door 72 has standard latching components 76 and is surrounded by a conventional jamb 74. Bordering jamb 74 is a decorative filigree panel 78 which contains a multitude of depressions 80. One such depression 82, known only to the user(s), provides for an access aperture to probe switch 84 in exactly the same way as depression 48 provides access, via probe 50, to switch 14 in FIG. 3. It is, indeed, feasible to arrange for a single probe 50 to be used for the activation of both the user's auto switch 14 and the user's home entry switch 84.

Door 72 and jamb 74 are fitted with conventional burglar alarm contacts 86. Both switch 84 and contacts 86 are connected to the alarm control unit 88. Alarm circuit 88 being conventional and, therefore, not shown in detail, is designed to have a short term time delay component of the type which is activated by the momentary closing of switch 84. This time delay, when activated, allows for the user to use his keys to open latching 76, enter the domicile and close the door 72 before alarm system 88 reactivates, thus circumventing the usual disturbing alarm sounding as the user races for the conventional reset switch.

Since special depression 82 is known only to the user, other depressions 80 may be wired with switches which purposely trigger the alarm system 88 when tampered with by unauthorized entrants. Alternately, several switches of known location to the user(s) may be strategically located through panel 78 and may be wired in parallel with switch 84. The user can then appear to choose at random a known depression to activate the alarm delay.

The security system may also be supplemented in the manner as shown in FIGS. 5, wherein an array of switches 84, 84' and 84" may be hidden behind panel 78 and wired in such a way that requires a definite sequence of switch closings known only to the user.

As a specific example of authorized equipment control using the probe-switch, reference should be made to FIG. 6 which shows a row of lamps 92 that might be found in a parking area, boardwalk, estate grounds, park or the like. These lamps are usually turned on at dusk by a light sensing element and remain on until the light sensor senses dawn. In most cases, full lighting is only required in the early part of the evening and limited lighting thereafter. To that end, FIG. 6 shows a depression 94 in lamp base 96 by which hidden switch 98 can be selectively activated to turn off lamp 100 as desired by authorized personnel having a comparable probe 50. Appropriate circuitry (not shown) would provide for relighting of all lamps 100 at the following dusk.

Depression 94 in lamp base 96 may be hidden by a filigree panel or be plainly visible depending on the likelihood of tampering or vandalism. Application of the probe switch in this instance provides for weather protection of the circuitry as well.

In composite FIG. 7 is shown a group of switches 14 and probes 50, each respectively designated A through D. Switches 14 A-D are made in decreasing operating length L to cooperate with active length $L_1$ of probes 50A-D. The active length $L_1$ of the shaft of probe 50 is limited by shoulderlike handle 102. Switches 14 A-D may be of the normally open or normally closed modality depending on the circuitry to which it is connected.

In addition to length variations, FIG. 8 shows an assortment of probes 50 E-H, in different cross-sections that might also be used in connection with comparable apertures to activate switches 14 E-H (not shown).

For brevity's sale, the probe-switch combination has been shown and described only in its simplest form. It should be apparent, however, that those skilled in the art could easily develop the concept further by the use of appropriate circuitry, and multiple switches 14 used with multifaceted probes 50. Variations of probe geometry, length and transverse dimensions would also lead to the generation of many possible unique probe-switch applications. Accordingly, it is intended that the disclosure be taken as illustrative of and not limiting of the present invention.

What is claimed is:

1. A switch for use in a security system comprising a cooperating pair of electrical contacts consisting of a first stationary contact and a second movable contact normally in a spaced clearance position therefrom so as to correspondingly provide said switch with a normally open condition, a switch mounting member in the form of a hollow tube bounding a smooth cylindrical operative compartment oriented lengthwise thereof having a first opening at a distal end of said compartment and a second opening at an opposite proximal end thereof, said pair of contacts being mounted in said distal end first opening of said compartment and said hollow tube being attached with said proximal end second opening adjacent to and affixed to a support wall, so as to position said pair of contacts in a rearwardly spaced relation behind said support wall, said support wall having an opening aligned with said second opening and of the same cross-section, and a probe, sized to project into said compartment and electrically close said contacts, whereby the presence of said switch is undetectable except for said support wall opening.

* * * * *